(12) United States Patent
Ruffa et al.

(10) Patent No.: US 12,209,960 B1
(45) Date of Patent: Jan. 28, 2025

(54) NON-INVASIVE TENSION MEASURING SYSTEM

(71) Applicant: The United States of America as represented by the Secretary of the Navy, Newport, RI (US)

(72) Inventors: Anthony A Ruffa, Hope Valley, RI (US); Brian K Amaral, Newport, RI (US)

(73) Assignee: The United States of America as represented by the Secretary of the Navy

( * ) Notice: Subject to any disclaimer, the term of this patent is extended or adjusted under 35 U.S.C. 154(b) by 330 days.

(21) Appl. No.: 17/695,916

(22) Filed: Mar. 16, 2022

(51) Int. Cl.
*G01N 21/47* (2006.01)

(52) U.S. Cl.
CPC ... *G01N 21/474* (2013.01); *G01N 2021/4735* (2013.01); *G01N 2021/4742* (2013.01)

(58) Field of Classification Search
None
See application file for complete search history.

(56) References Cited

U.S. PATENT DOCUMENTS

| | | | |
|---|---|---|---|
| 11,631,432 B1 * | 4/2023 | Hay | G06F 16/7335 382/107 |
| 2016/0217587 A1 * | 7/2016 | Hay | A61B 5/0077 |
| 2018/0356205 A1 * | 12/2018 | Hatahori | G01B 9/02095 |
| 2019/0154439 A1 * | 5/2019 | Binder | G01B 11/026 |
| 2022/0128352 A1 * | 4/2022 | Binder | G01S 15/42 |
| 2023/0220771 A1 * | 7/2023 | Chen | E21B 49/10 166/250.01 |

FOREIGN PATENT DOCUMENTS

| | | | | |
|---|---|---|---|---|
| CN | 113484912 A | * | 10/2021 | E21B 17/026 |
| ES | 2314422 T3 | * | 3/2009 | A61B 17/22004 |

OTHER PUBLICATIONS

UNSW ("The wave equation and wave speed," UNSW School of Physics, Internet Archive Date Mar. 12, 2022, https://www.animations.physics.unsw.edu.au/jw/wave_equation_speed.htm). (Year: 2022).*
Breed ("k-omega beamforming on non-equally spaced line arrays," B.R. Breed, The Journal of the Acoustical Society of America, Aug. 1, 2001). (Year: 2001).*

(Continued)

*Primary Examiner* — Uzma Alam
*Assistant Examiner* — Chad Andrew Reverman
(74) *Attorney, Agent, or Firm* — James M. Kasischke; Michael P. Stanley; Jeffry C. Severson (57) ABSTRACT

A non-invasive tension measuring system is provided with at least one pair of sensors positioned longitudinally and at a predetermined distance from each other along a linear system. At least one operationally connected processor executes instructions to detect, using the sensors, a transverse wave propagating along the linear system in order to determine a time delay of the transverse wave, to determine a propagation speed of the transverse wave based on the time delay, and to determine a tension of the unit length of the linear system based at least in part on the propagation speed and a mass per the unit length of the linear system.

17 Claims, 6 Drawing Sheets

(56) References Cited

OTHER PUBLICATIONS

ESA ("The Electro Magnetic Spectrum," European Space Agency, Internet Archive Date Jan. 5, 2020, https://web.archive.org/web/20200105233644/http://www.esa.int/Science_Exploration/Human_and_Robotic_Exploration/Lessons_online/ The_electromagnetic_spectrum). (Year: 2020).*

Chen ("A convenient cable tension estimation method simply based on local vibration measurements to fit partial mode shapes," Chen et. al., Engineering Structures, vol. 272, Dec. 2022, https://www.sciencedirect.com/science/article/pii/S0141029622010847) (Year: 2022).*

Kalista ("A Vibration Sensor-Based Method for Generating the Precise Rotor Orbit Shape with General Notch Filter Method for New Rotor Seal Design Testing and Diagnostics," Kalista et al., NTIS, Aug. 2021, https://www.mdpi.com/1424-8220/21/15/5249) (Year: 2021).*

* cited by examiner

NON-INVASIVE TENSION MEASURING SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER APPLICATIONS

None.

BACKGROUND OF THE INVENTION

(1) Field of the Invention

The present invention generally relates to estimating cable tension using non-invasive measurements on the cable.

(2) Description of the Related Art

Measuring tension in a system, and specifically a linear system, provides insight into safety verification and dynamics information for the system.

Various approaches exist for measuring tension in a cable. One such approach positions a tension meter in-line with a cable of interest by constraining the cable at two ends of the tension meter with a slack loop bypassing the meter. This testing configuration is challenging because of the difficulty of constraining the cable and the tension meter. In addition, invasive components such as shackles or clamps can damage the cable.

Alternatively, the cable tension may be measured by routing a cable over a pulley and coupling a scale/tension meter to the pulley and to a fixed point. This approach is also invasive, as the approach requires overhead rigging, has numerous failure points and, in non-vertical situations, adds a dynamic trigonometric parameter that can reduce the accuracy of the measurement.

As such, a need exists for a solution that infers the tensions present in a cable under test without inducing inflection. Objectives also include exploring less invasive technologies for estimating cable tension.

BRIEF SUMMARY OF THE INVENTION

Accordingly, it is therefore a primary object and general purpose of the present invention to estimate tension in a linear system by analyzing the propagation of transverse waves detected in the system.

In a first embodiment, a non-invasive tension measuring system includes data collection devices affixed to a linear system. At least one pair of the collection devices is positioned adjacent to each other at a predetermined distance or a unit length along the linear system.

In the system, processors execute instructions to: operate the data collection devices; detect a transverse wave propagating along the linear system; determine a time delay of the transverse wave and, in turn, a propagation speed of the transverse wave; and determine a tension of the unit length of the linear system based on the propagation speed and a mass per unit length of the linear system.

In a second embodiment, a non-invasive tension measuring system includes a cable assembly, an optical interrogator, and at least one processor. The cable assembly includes at least one optical fiber integrated within a linear system. The interrogator communicates with the at least one optical fiber.

The at least one processor is configured with executable instructions to define regions along the cable assembly. The at least one processor also includes executable instructions: to operate the light source and send an optical signal through the at least one optical fiber; to operate the receiver to receive backscattered light particles associated with the optical signal; to identify subsets of backscattered light particles associated with each region; to determine a time-of-flight measurement for the subsets of backscattered light particles; to determine a propagation speed associated with each region based on the respective time-of-flight measurements; and to determine a tension of each region based on the propagation speed and the mass per the unit length of each region.

These and other objects, features, and advantages of the present invention will become more readily apparent from the attached drawings and the detailed description of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

The system described herein is minimally invasive or even non-invasive for determining the properties present in a linear system and for supporting inferences into the characteristics of the linear system.

For example, the system exploits transverse waves propagating in a linear system. Sources of transverse waves in a cable being towed through a medium by a vessel include cable strum, waves from vessel motion, and waves transmitted to the cable from winch and sheave contact points. Cable strum includes transverse vibrations induced by vortex shedding.

Embodiments of a non-invasive tension measuring system include data communication with a transverse wave sensing structure mounted to and/or integrated with a cable under tension. The systems measure cable tension by measuring a propagation speed of transverse waves in the cable as provided by Equation (1):

$$c = \sqrt{\frac{T}{m}} \quad (1)$$

where "c" is the propagation speed of transverse waves in the cable, "T" is the cable tension and "m" is the cable mass per unit length. As an example, consider a one inch diameter steel cable with T=1000 Newtons (N) and m=1 kilogram per meter (kg/m). Using Equation (1), the propagation speed is approximately 31.6 meters per second.

Figure 1:
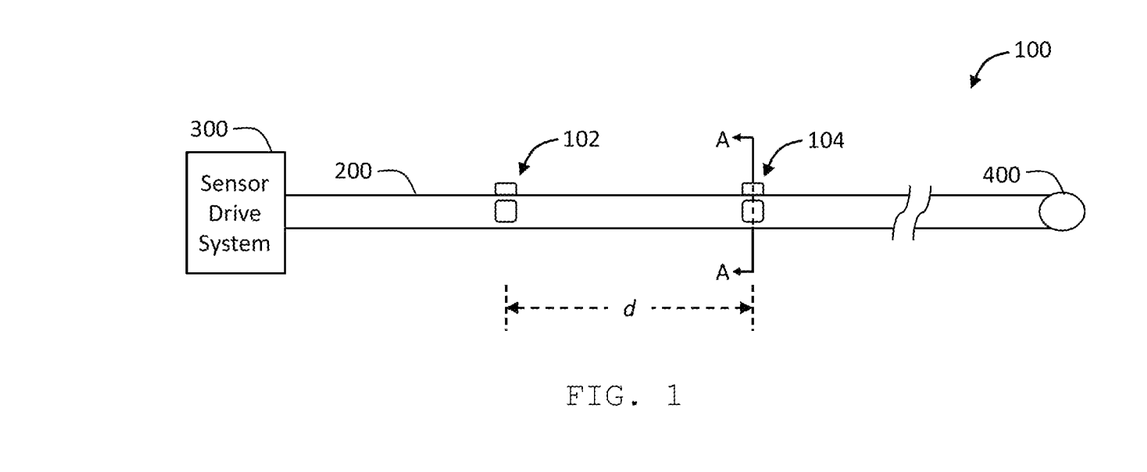
FIG. 1 depicts a first non-invasive tension measuring assembly of the present invention.
Figure 2:
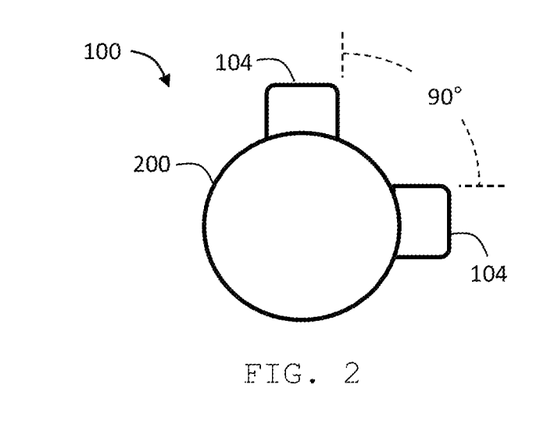
FIG. 2 depicts a cross-section view of the measuring assembly of FIG. 1 with the view taken along reference lines A-A of FIG. 1.

Referring to FIG. 1 and FIG. 2, a first embodiment of a non-invasive tension measuring system 100 tests a cable 200 on which accelerometers 102 and 104 are attached at a distance "d" between the devices. The accelerometers 102 and 104 measure vibrations due to cable strum.

In the event that no cable strum nor any similar measurable acceleration is present in the cable 200; transverse waves can be introduced by using a mechanical shaker or by striking the cable.

Each accelerometer 102 and 104 affixed to the cable 200 comprises two accelerometers separated at ninety degrees around a circumference of the cable. This configuration enables each accelerator pair to detect a transverse wave of vertical and horizontal wave components.

A first end of the cable 200 connects with a sensor drive system 300. A second end of the cable 200 may terminate physically at a weighted body 400. Alternatively, the second end of the cable 200 may be at a point along the cable beyond which no additional spaced accelerators are positioned and, therefore, no transverse wave detection takes place. The transverse waves propagate along the cable 200 from the first end to the second end and/or vice versa; thereby, producing a time delay between the accelerometers 102 and 104.

The time delay "t" is measured by the sensor drive system 300 to infer the propagation speed "c" and the tension "T" when the mass "m" per unit length is known, either by direct measurement (e.g., by weighing the cable section between the accelerometers 102 and 104) or from manufacturer specifications.

Figure 3:
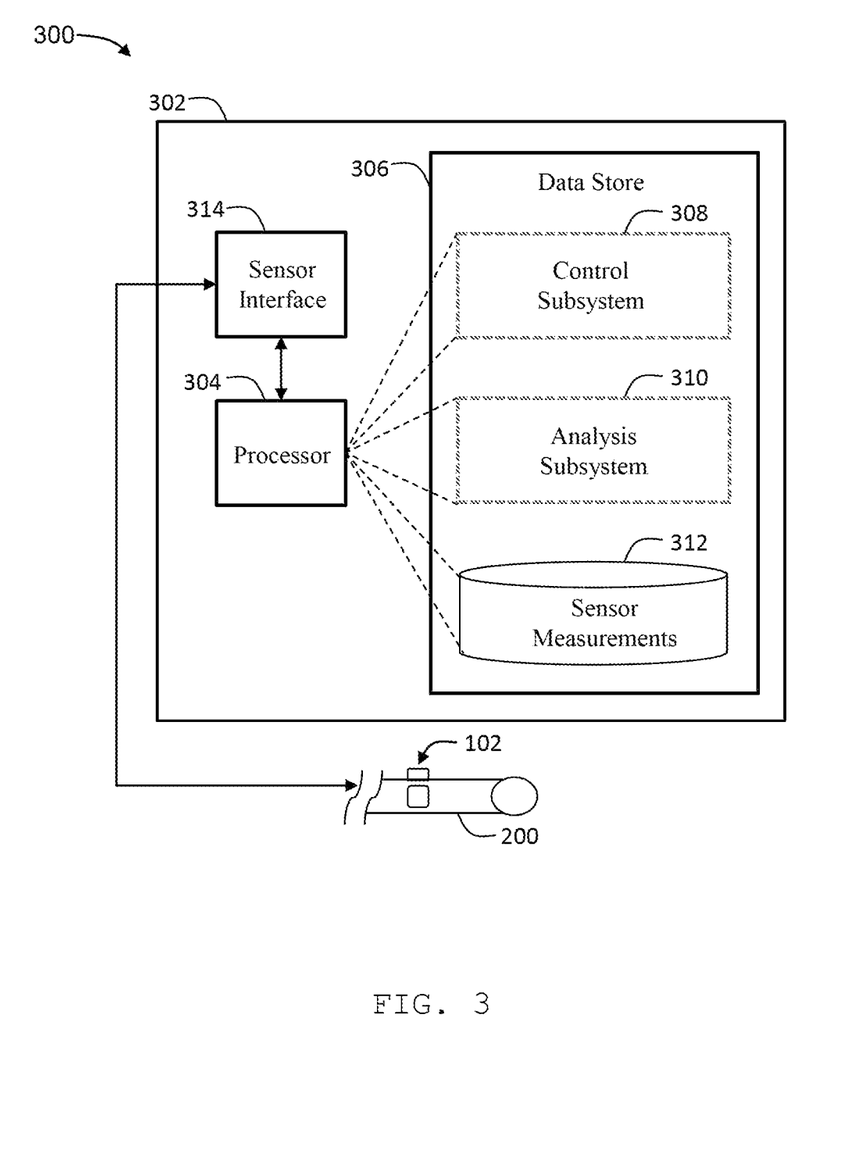
FIG. 3 depicts a schematic of a sensor drive system of the present invention using the tension measuring assembly of FIG. 1.

Referring to FIG. 3, a sensor drive system 300 has a computing resource 302 with a processor 304 and data storage 306. The instructions of the sensor drive system 300 implement a control subsystem 308, an analysis subsystem 310 and/or a sensor measurements database 312 that is stored in the data store 306 and retrieved by the processor 304. The control subsystem 308 allows the processor 304 to operate a sensor interface 314 in order to transmit to and/or receive data from the accelerometer 102 and 104.

The analysis subsystem 310 allows the processor 304 to record and retrieve transverse wave data using the sensor measurements database 312 and to determine respective time delays for sensed transverse waves propagating between adjacent pairs of accelerators and, by inference, respective cable tensions between adjacent accelerator pairs as a function of the propagation speed of the sensed transverse waves. For example, by solving Equation (1) for the cable tension "T".

The analysis subsystem 310 is implemented with various algorithms to measure the time delay between adjacent accelerometers along a cable. For example, performing a cross-correlation of the time series returns an estimate of the time delay "t" between the signals. A one meter separation leads to a detectable time delay of approximately 0.03 seconds. The time delay is the same for transverse waves propagating in alternating directions In embodiments that comprise multiple sensor pairs deployed along a cable; a series of time delays can be measured between pairs of sensors. The propagation speed estimate is then averaged to increase the accuracy of the cable tension estimate.

The sensor drive system 300 employs any or all of the control subsystem 308, the analysis subsystem 310, and/or the sensor measurements database 312 collocated upon the host computing resource 302 or distributed among two or more host computing resources.

Figure 4:
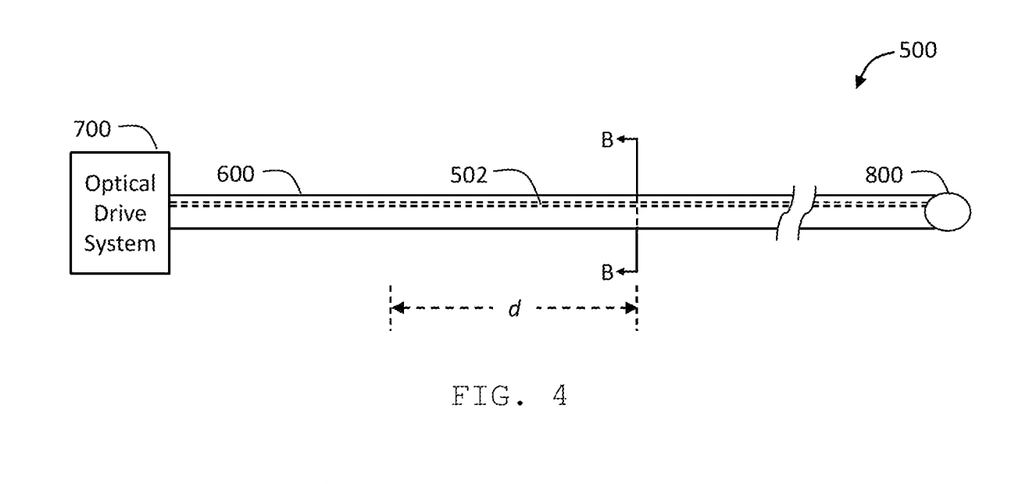
FIG. 4 depicts a second non-invasive tension measuring assembly of the present invention.
Figure 5:
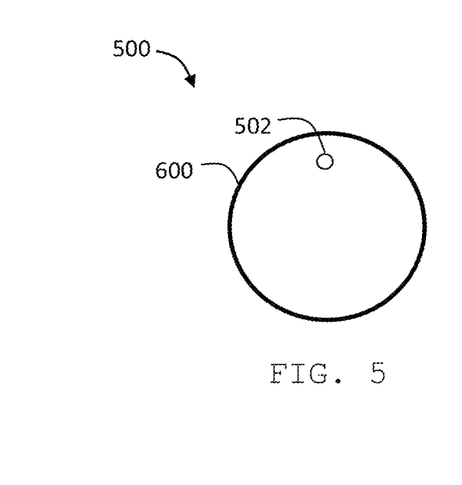
FIG. 5 depicts a cross-section view of the tension measuring assembly of FIG. 4 with the view taken along reference lines B-B of FIG. 4.

Referring to FIG. 4 and FIG. 5, an exemplary embodiment of a second non-invasive tension measuring system 500 comprises a cable 600 with an integrated optical fiber 502. As used herein, Rayleigh scattering refers to the scattering of light or other electromagnetic radiation by particles much smaller than the radiation wavelength. Rayleigh scattered measurements from the optical fiber 502 determine strain along the cable 600.

Measurement positions are non-invasively defined within the optical fiber 502 at a distance "d" to bound a measurement region for vibrations present in the cable 600. Similar to the embodiment of FIG. 1, transverse waves can be proactively introduced.

In use, the transverse waves induce strain in the cable 600. The present invention supports strain detection via Rayleigh-scattered measurements in a standard single mode or multimode telecommunications grade fiber 502 that is longitudinally coextensive with the cable 600. In FIG. 5, the optical fiber 502 is integral to the measured cable 600.

Alternatively, the optical fiber 502 can mount either non-invasively or with minimally invasive connectivity to an outer surface of the cable 600. The longitudinally-positioned optical fiber 502 detects a transverse wave aligned to an angle around the circumference of the cable 600.

A first end of the cable 600 connects (e.g., physically and/or in optical communication) with an optical drive system 700. A second end of the cable 600 may terminate physically at a weighted body 800 for aiding the cable to reach a desired position in a deployment environment. Alternatively, the second end may terminate at a processing bin positioned along the cable 600 beyond which no additional strain measurements are required.

The transverse waves propagate along the cable 600 from the first end to the second end, and/or vice versa to produce a time delay t=c/d between the two measurement positions. This time delay "t" is measured by the optical drive system 700 to infer the propagation speed "c" and, by extension, the tension "T" when the mass "m" per unit length is known, either by direct measurement (e.g., by weighing a section of the cable 600) or from the manufacturer's specifications of the cable.

Figure 6:
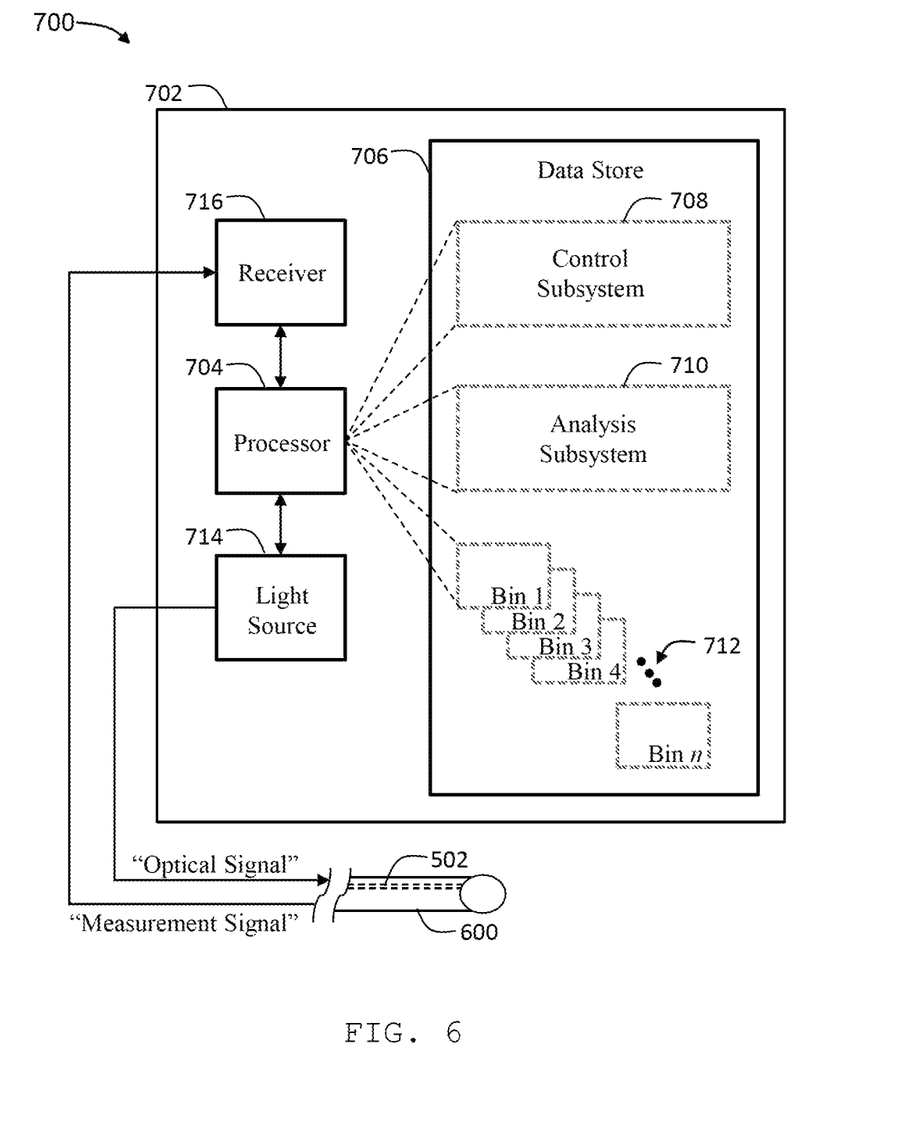
FIG. 6 depicts a schematic of an optical drive system of the present invention using the second non-invasive tension measuring system of FIG. 4.

Referring now to the block diagram of FIG. 6; the optical drive system 700 includes a computing resource 702 with a processor 704 that executes computerized instructions. A data store 706 stores data and instructions used by the processor 704.

The computerized instructions of the optical drive system 700 implement a control subsystem 708, an analysis subsystem 710, and/or some number of processing bins 712 that are stored in the data store 706 and are retrieved by the processor 704. The control subsystem 708 allows the processor 704 to operate a light source 714 to transmit an optical signal into the cable 600 and to operate a receiver 716 that receives and interprets Rayleigh-scattered measurements from the measurement positions defined in the cable.

The analysis subsystem 710 allows the processor 704 to record and retrieve transverse wave data using the processing bins 712. The analysis subsystem 710 determines respective time delays for sensed transverse waves propagating between adjacent pairs of measurement positions and, by inference, respective cable tensions between the adjacent measurement position as a function of the propagation speed of the sensed transverse waves.

Employing the adaptation of optical time domain reflectometry described for FIG. 6; the optical drive system 700 collects time-of-flight measurements of backscattered light into the processing bins 712 defined for each distance "d" along the cable 600. This leads to strain measurements corresponding to each processing bin 712 from which the analysis subsystem 710 infers the tension "T" along the entire cable 600.

For the embodiments described, inference of the cable tension is accomplished by using a variety of deterministic approaches. Equation (1) is used to infer the tension "T" when "c" is first determined via a cross-correlation of signals between two adjacent accelerometers or processing bins. Alternatively, the cable tension "T" is inferred by measuring standing waves or by using a k-ω approach.

If standing waves are present in a linear system of interest due to cable strum, an alternative approach to inferring cable tension "T" involves measuring the amplitude of standing waves in the cable. This is a direct approach to estimate the wavelength, which leads to determination of the propagation speed using c=fλ, where "λ" is the wavelength and "f" is the strum frequency. Note that the wavelength will vary along the cable because the tension varies.

A k-ω plot is a two-dimensional fast Fourier transform (FFT) in the time dimension and the spatial dimension of time series signals from a line array of "n" receivers. If the frequency "ω" represents the vertical axis and the wavenumber k=ω/c represents the horizontal axis; then energy propagating at a fixed speed "c" will appear as a straight line with a slope c=dω/dk.

For the present invention, only waves propagating along the direction of the line array in both directions need be considered, which corresponds to the wavenumber $k_0=\pm\omega/c_0$. The measurement error is governed by the wavenumber resolution, which is $\Delta k=2\pi/L$, where "L" is the length of the line array of receivers.

For the Rayleigh scattered measurements of strain described in the second embodiment, each measurement bin is one-half meter in length. Therefore, for two hundred bins, L=100 meters.

Cable strum is typically the dominant mode of transverse vibration, and the frequency is approximately 10 Hertz. The propagation speed of transverse waves is c=30 meters/second. Consequently, the error estimate is calculated by Equation (2):

$$\frac{\Delta k}{k_0} = \frac{2\pi/L}{\omega/c_0} = \frac{30}{10\cdot 100} = 3\% \tag{2}$$

Because cables may be a mile in length; the scope of measurement estimation could extend to receivers of n=1000 or more. However, the propagation speed variation due to the tension variation in the cable would exceed the error in the propagation speed estimate due to the wavenumber resolution.

Implementation of the optical drive system 700 may employ any or all of the control subsystem 708, the analysis subsystem 710, and/or the processing bins 712 collocated upon a single host computing resource 702 or distributed among at least two host computing resources.

The present disclosure uses computer instructions and/or system configurations that perform operations for determining cable tension. The instructions that include the control subsystem 308, 708, the analysis subsystem 310, 710, instructions of the sensor measurements database 312, and/or the instructions of the processing bins 712 is not meant to be limiting in any way.

For example, the processors 304, 704 may be in data communication with external devices and may be configured to direct input from the external devices to the data stores 306, 706 for storage and subsequent retrieval. Therefore, an additional subsystem recorded to the data stores 306, 706 enable the processors 304, 704 to retrieve data from the data stores and to forward as output to various networked components.

Figure 7:
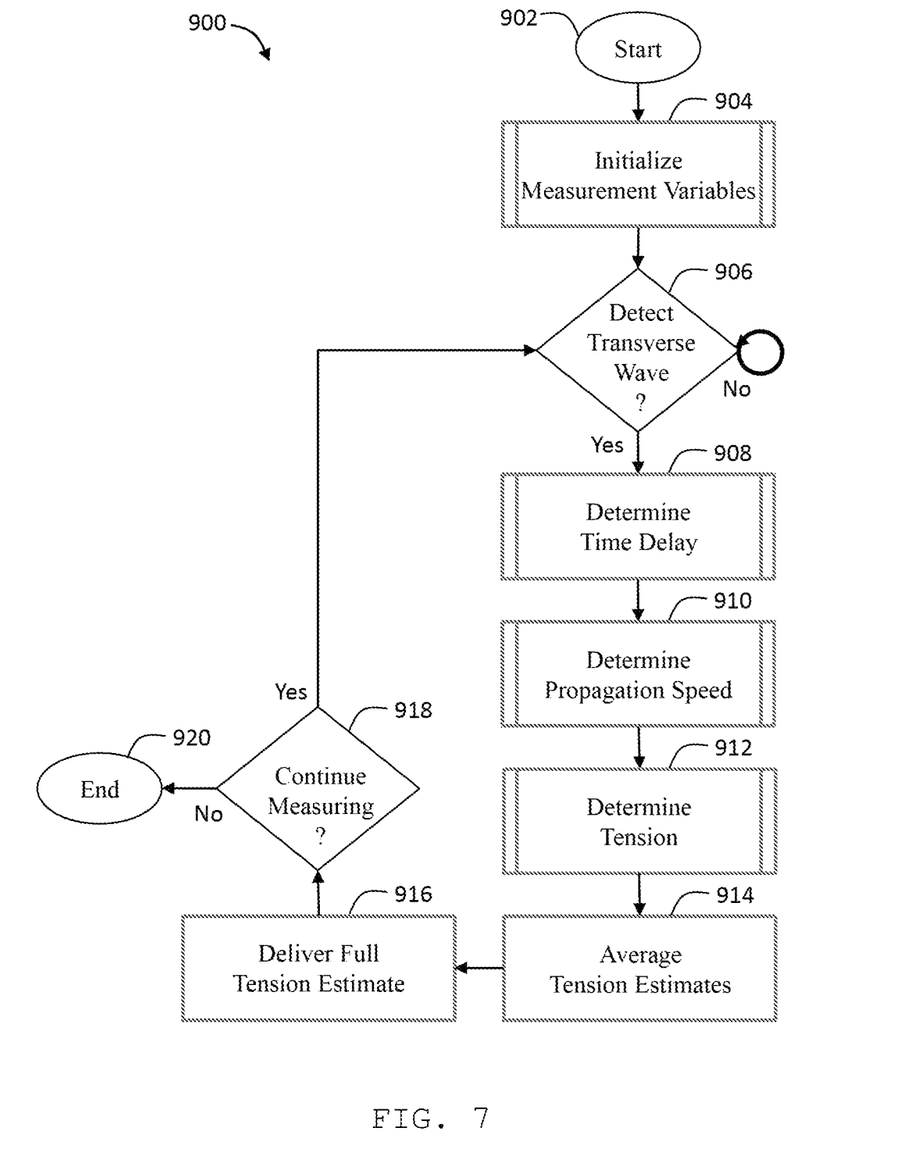
FIG. 7 depicts a flow chart of exemplary steps of a non-invasive tension measuring method of the present invention.

Referring now to FIG. 7, block diagram 900 illustrates the operational sequence and use of computer-assisted aspects of the present invention. Starting at Block 902, the sensor drive system 300 or optical drive system 700 performs an initialization at Block 904 of known values to be used in tension measurement calculations.

The known values include a spacing distance between sensors that defines a unit length of the linear system 200, 600 and a mass of the unit length of the linear system. If the embodiment of the present invention defines a plurality "n" of unit lengths of the linear system 200, 600; then initialization values for each unit length or measurement region are recorded. At Block 906, the drive system 300, 700 operates the sensors 102, 104, 502 to detect a transverse wave propagating through the linear systems 200, 600.

In Block 906, the drive system 300, 700 can continue to loop until a transverse wave is detected. In Block 908, the drive system 300, 700 determines a time delay(s) during which the transverse wave propagates the defined spacing distance(s) of the measurement region(s). At Block 910, the drive system 300, 700 uses the time delay(s) and spacing distance(s) to determine a propagation speed of the transverse wave for the employed measurement region(s).

At Block 912, the sensor drive system 300, 700 then uses the computed propagation speed and the retrieved mass of the unit length(s) of the linear system 200, 600 to solve for the tension(s) of each measurement region of the linear system. Regarding Block 912, if more than one measurement region is employed in the estimation calculation method 900; then some subset of all determined tensions is averaged at Block 914 to determine a full tension estimate for the entire linear system 200, 600. At Block 916, the drive system 300, 700 delivers the full tension estimate by displaying the tension estimate to a user interface, and/or by forwarding the tension estimate to an automated application for further processing).

In Block 918 and if ongoing tension monitoring for the linear system 200, 600 is required; the process may be repeated starting at the transverse wave detection loop of Block 906. If not, operation of the tension measuring system ends at Block 920.

Figure 8:
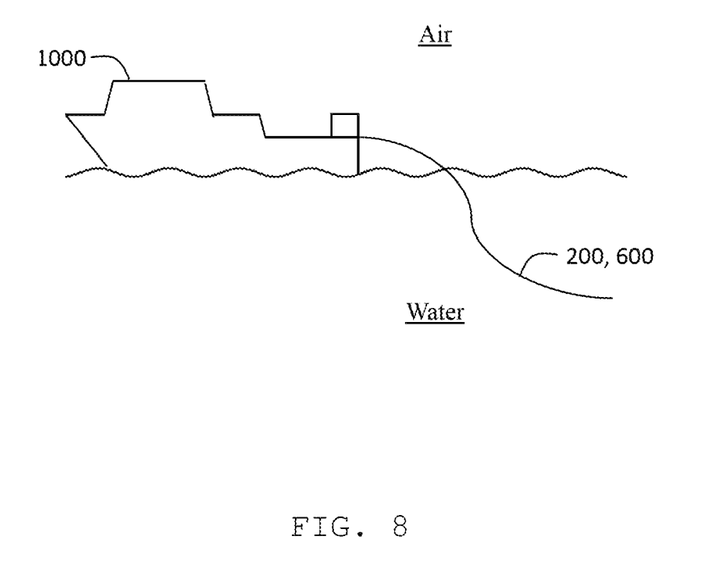
FIG. 8 depicts examples of the tension measuring assemblies of FIGS. 1 and 4 in deployed configurations.

In FIG. 8, deployment of the present invention in environments that complicate wave propagation measurement with hydrodynamic loading are described. For example, when towing a cable 200, 600 behind a vessel 1000; a transverse propagation speed experienced by the cable in water differs from that in the air because of hydrodynamic loading (also known as added mass). The present invention can determine where the cable 200, 600 enters the water also known as a cable air/water interface.

Hydrodynamic loading in the form of added mass alters the propagation speed of transverse waves. Thus, a difference in the propagation speed and the wavelength is detected when sections of the linear system transitions from air to water. A cable in water will have a lower speed of propagation for the same tension because of added mass. The formula for this scenario is represented in Equation (3):

$$c = \sqrt{\frac{T}{m + m_a}} \quad (3)$$

where "$m_a$" is the added mass per unit length, which is equal to the cable volume per unit length times the density of water.

Because the tension of the cable 200, 600 is continuous across the air/water interface; a discontinuity is detected in the propagation speed between sensor points positioned in the air and adjacent sensor points positioned in the water. For example, the optical drive system 700 will identify the specific optical time-domain reflectometer measurement from the set of processing bins 712 containing the air/water interface. As a result, the air/water interface can be determined using the present invention with a precision of one-half meter along the cable 600.

The present invention recognizes that transverse waves have propagation speeds that are governed by the cable tension. Thus, measuring those propagation speeds leads to an accurate measurement of the tension.

Embodiments of the present invention are likely less expensive and easier to implement than devices known in the art, especially for estimating tension in steel and Kevlar cables that are one inch and greater in diameter and that typically have operating tensions in the range of thousands of pounds.

In the first embodiment described above, the present invention uses accelerometers that mount onto a cable of interest without requiring any tie-points or rigging fixtures such as shackles that can be cumbersome and difficult to implement and/or that can induce failure points to the cable system. Depending on the device and the cable, the accelerometers can be clamped or even glued to the cable. Clamping or gluing to the cable has a negligible change in tension or contact stress compared to conventional apparatus for measuring tension in a cable.

The present invention is scalable in the diameter of the cable as well as the tension of cable; is safer due to being non-invasive and requiring no additional failure points, and is widely applicable for measuring nearly any cable at any tension.

In the second embodiment, an apparatus does not need to be attached to the cable. The measurements are made via Rayleigh scattered measurements in optical fibers integrated and/or surface-mounted with the cable of interest.

The measurement methods using accelerometers and Rayleigh-scattered measurement fibers are not the only approaches that can acquire the required time series data at two or more points on a cable of interest. Other measurement methods include magnetic pickups and Doppler velocity sensor measurements. The key inventive concept of magnetic pickups and Doppler velocity sensor measurements is based on the use of time series data from at least two locations on the cable of interest in which transverse waves that that propagate between these two locations are recognized. Magnetic pickups and Doppler velocity measurements can both generate time series data at the two locations that can enable to estimate a time delay between those locations.

The present invention eliminates the need for additional rigging equipment, overhead loading, compounding forces, and extraneous trigonometric parameters in dynamic environments to increase safety, accuracy and ease of implementation. The present invention is also scalable, unlike most prior art tension meters that have a fixed or scaled resolution and a maximum load limit.

Also, the tension measurement technology of the present invention is invariant to cable twist. Even torque-balanced cables twist significantly under tension. Because the present invention only relies on the propagation speed of transverse waves; there is no dependency on twist angles.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A system for estimating tension in a freely vibrating linear system, said system comprising:
   a plurality of data collection devices affixed to the freely vibrating linear system, wherein at least one pair of said data collection devices is positioned longitudinally at a predetermined distance from each other to define a unit length along the freely vibrating linear system; and
   at least one processor operationally connected to said plurality of data collection devices with said at least one processor configured with executable instructions to detect a transverse wave propagating along the freely vibrating linear system using said at least one pair of data collection devices, to determine a time delay of the transverse wave along the unit length, to determine a propagation speed of the transverse wave based on the time delay, and to determine a tension of the unit length based on the propagation speed and a mass per the unit length;
   wherein each of said at least one pair of data collection devices comprises a first sensor and a second sensor with said second sensor positioned about a circumference of the linear system at a ninety-degree angle relative to said first sensor.

2. A system for estimating tension in a freely vibrating cable, said system comprising:
   at least one optical fiber mounted to and longitudinally coextensive with the freely vibrating cable; and
   an optical interrogator in optical communication with said at least one optical fiber, said optical interrogator including at least one processer configured with executable instructions to define a plurality of regions longitudinally along the freely vibrating cable wherein each region is characterized by a predetermined length, transmitting an optical signal through said at least one optical fiber, receiving a plurality of backscattered light particles associated with the optical signal using said optical interrogator, identifying a subset of the plurality of backscattered light particles associated with one of the regions to define a measured region, determining a time-of-flight measurement for the subset of backscattered light particles, determining, based on the time-of-flight measurement, a propagation speed associated with the measured region; and determining tension of the measured region based on the propagation speed and a mass of the measured region.

3. The system in accordance with claim 2, wherein said at least one optical fiber is integrated into the freely vibrating cable.

4. The system in accordance with claim 2, wherein the executable instructions include determining whether the measured region is deployed in water based on the propagation speed, the mass and a water mass displaced per the measured region.

5. The system in accordance with claim 4, wherein the time-of-flight measurement is a Rayleigh-scattered measurement type.

6. A method of estimating tension in a freely vibrating linear system, said method comprising the steps of:
   detecting a transverse wave that propagates along the freely vibrating linear system using at least one pair of sensors positioned longitudinally along the freely vibrating linear system at a unit length of the linear system between said at least one pair of sensors of the freely vibrating linear system;
   determining a time delay of the transverse wave propagating along the freely vibrating linear system between the at least one pair of sensors;
   determining a propagation speed of the transverse wave based on the time delay; and
   determining a tension of the unit length based on the propagation speed and a mass per the unit length.

7. The method in accordance with claim 6, said method further comprising the step of defining the at least one pair of sensors as a processing bin positioned longitudinally along at least one optical fiber mounted to and longitudinally coextensive with the freely vibrating linear system.

8. The method in accordance with claim 7, said method further comprising the steps of:
   determining a respective time delay associated with the transverse wave propagating along the freely vibrating linear system between each of the plurality of pairs of sensors;
   determining a respective propagation speed of the transverse wave associated with each of the pair of sensors based on the time delay;
   determining a respective tension associated with each unit length of the freely vibrating linear system based on said propagation speed and a respective mass of the unit length of the freely vibrating linear system; and
   determining a full system tension associated with the freely vibrating linear system based on an average of the tensions of the unit lengths of the freely vibrating linear system.

9. The system in claim 1, in which the propagation speed of transverse waves in the cable in air is determined by the equation $$c = \sqrt{\frac{T}{m}}$$

where "c" is the propagation speed of transverse waves in the cable, "T" is the cable tension and "m" is the cable mass per unit length.

10. The system in claim 4, in which the propagation speed of transverse waves in the freely vibrating cable in water is determined by the equation $$c = \sqrt{\frac{T}{m + m_a}}$$

where "$m_a$" is the added mass per unit length.

11. The system in claim 1, in which the time delay of the transverse wave along the unit length is determined by the cross-correlation of signals between two adjacent processing bins.

12. The system in claim 1, in which the time delay of the transverse wave along the unit length is determined from the time series signals from a line array of "n" receivers using a k-ω approach.

13. The system in claim 1, in which the data collection devices include magnetic pickups.

14. The system in claim 1, in which the data collection devices include Doppler velocity sensor measurements.

15. The system in claim 1, in which transverse waves are introduced by using a mechanical shaker.

16. The system in claim 1, in which transverse waves are introduced by using by striking the cable.

17. The system in claim 1, in which an amplitude of standing waves is measured in the cable to determine the propagation speed using c=fλ, where "λ" is the wavelength and "f" is the strum frequency.

* * * * *